No. 622,777. Patented Apr. 11, 1899.
F. H. McGAHIE.
POWDER GRAIN.
(Application filed May 15, 1896.)
(No Model.) 4 Sheets—Sheet 1.

Attest:
H. Graham
E. L. Todd

Inventor,
Frederick H. McGahie
by
Geo. H. Graham
Atty

No. 622,777. Patented Apr. 11, 1899.
F. H. McGAHIE.
POWDER GRAIN.
(Application filed May 15, 1896.)
(No Model.) 4 Sheets—Sheet 2.
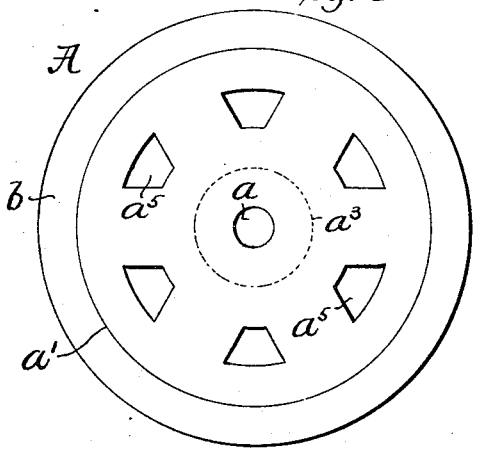
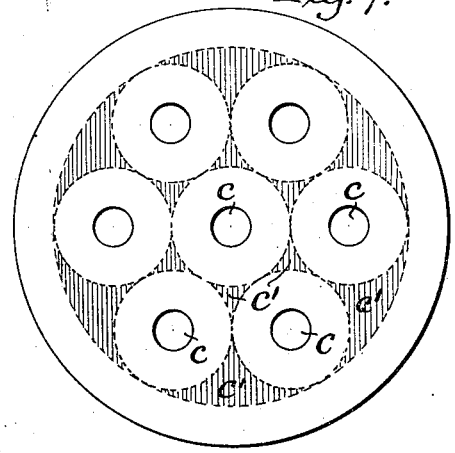
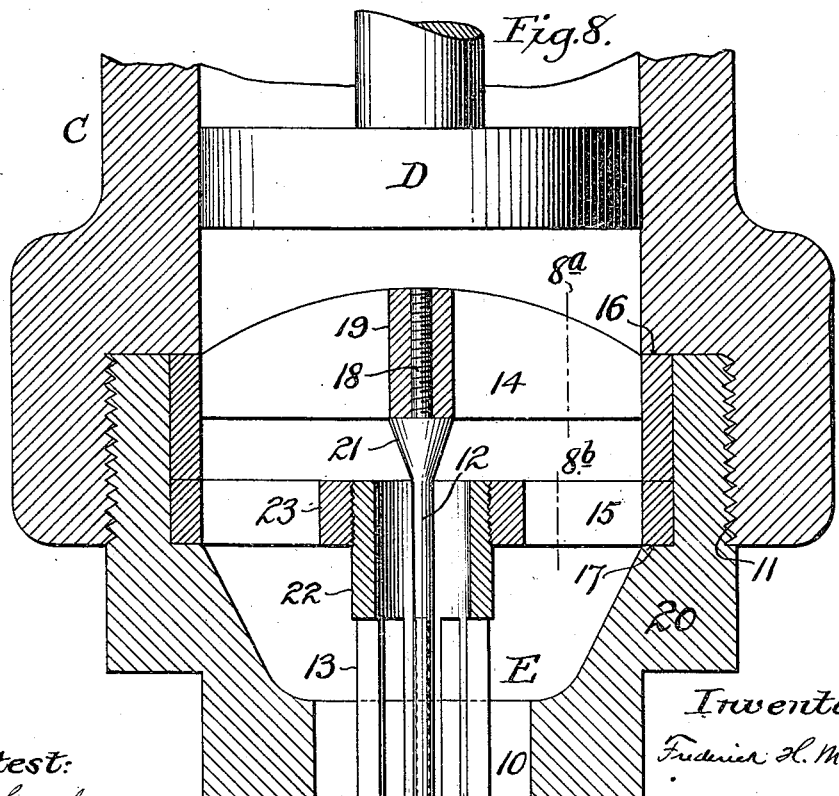
Attest:
A. Graham
E. L. Todd
Inventor,
Frederick H. McGahie
by
Geo. H. Graham
atty.

No. 622,777. Patented Apr. 11, 1899.
F. H. McGAHIE.
POWDER GRAIN.
(Application filed May 15, 1896.)
(No Model.) 4 Sheets—Sheet 3.

Attest:
H. Graham
E. L. Todd

Inventor:
Frederick H. McGahie,
by G. H. Graham
Atty.

No. 622,777. Patented Apr. 11, 1899.
F. H. McGAHIE.
POWDER GRAIN.
(Application filed May 15, 1896.)

(No Model.) 4 Sheets—Sheet 4.

Attest:
H. Graham
E. L. Todd

Inventor,
Frederick H. McGahie
by
Geo. C. Graham
Atty.

UNITED STATES PATENT OFFICE.

FREDERICK H. McGAHIE, OF FARMINGDALE, NEW JERSEY, ASSIGNOR, BY MESNE ASSIGNMENTS, TO THE E. I. DU PONT DE NEMOURS & COMPANY, OF WILMINGTON, DELAWARE.

POWDER-GRAIN.

SPECIFICATION forming part of Letters Patent No. 622,777, dated April 11, 1899.

Application filed May 15, 1896. Serial No. 591,617. (No specimens.)

*To all whom it may concern:*

Be it known that I, FREDERICK H. MCGAHIE, a citizen of the United States of America, residing at Farmingdale, county of Monmouth, State of New Jersey, have invented certain new and useful Improvements in Powder-Grains, of which the following is a specification.

The present invention relates to an improved form of multiperforated powder rod or grain.

The object of the invention is the production of a more efficient powder rod or grain particularly adapted to that class of colloid powders popularly known as "smokeless."

Generally speaking, the improved form of powder consists of a rod or grain of any suitable exterior contour, cylindrical, rectangular, or polygonal in cross-section, embracing a plurality of perforations of such shape and location as that when the rod or grain is burned the walls of the perforations attacked by the flame of combustion will gradually and progressively enlarge and will finally simultaneously meet at the moment the entire grain is consumed, leaving no portion for subsequent combustion on surfaces decreasing in area. The means for making this new form of powder may consist in one form in a die of suitable construction and configuration, as will be hereinafter fully set forth.

The accompanying drawings illustrate practical embodiments of the invention, in which—

Figure 3:
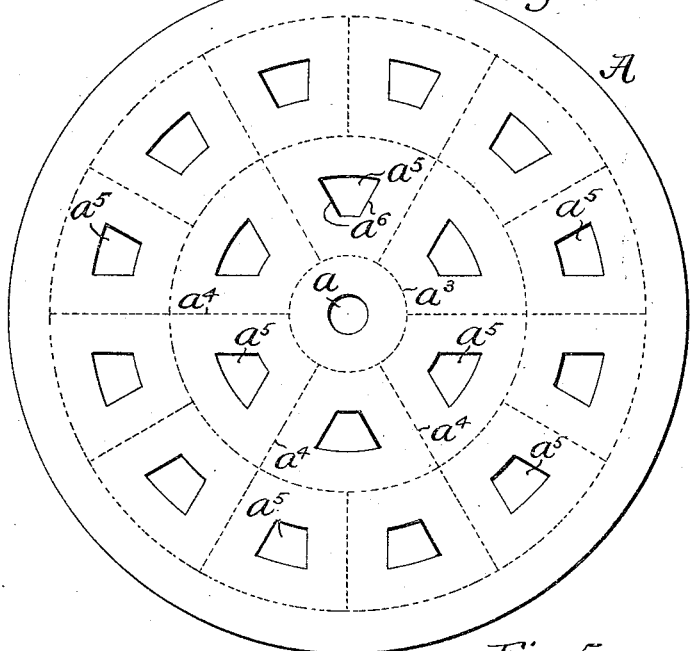
Figure 4:
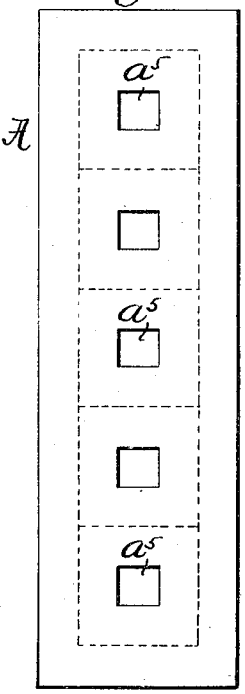
Figure 5:
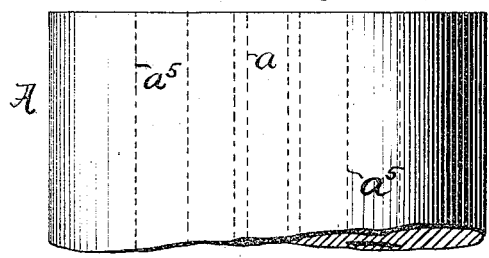
Figure 9:
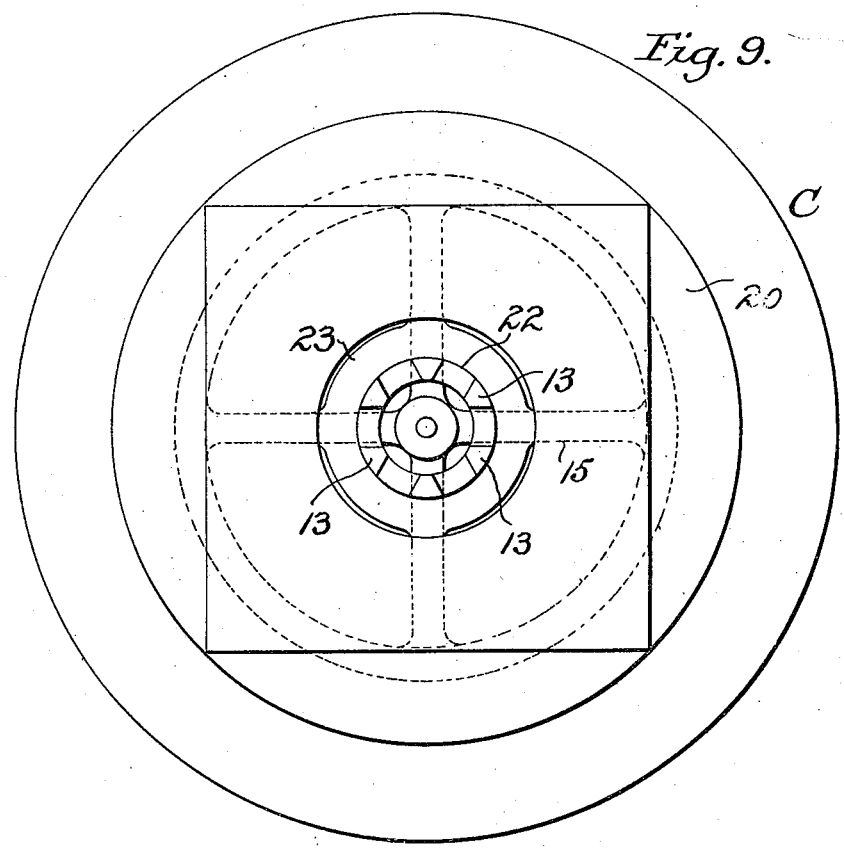
Figure 11:
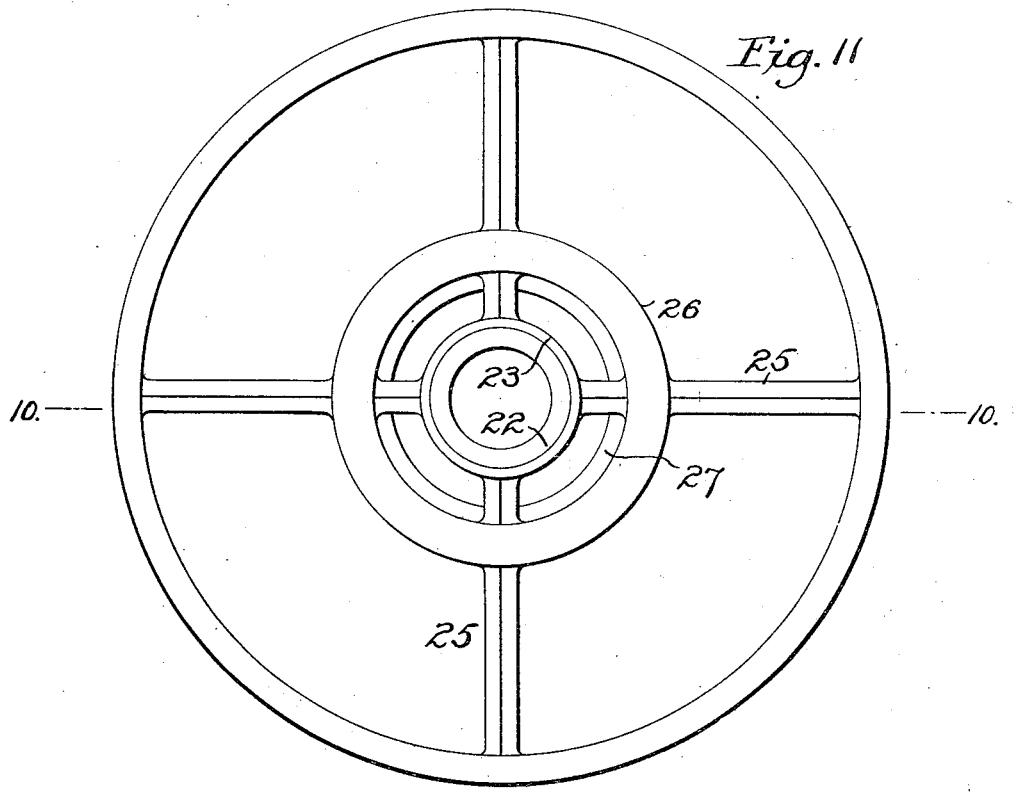
Figure 10:
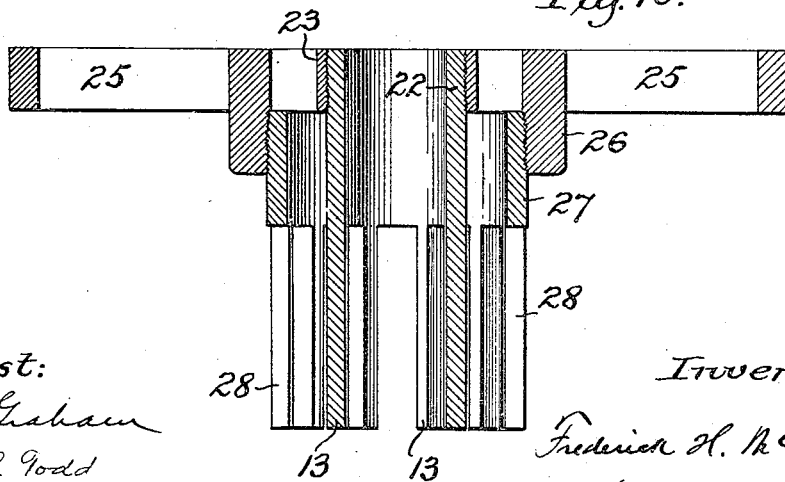

Figures 1, 2, 3, and 4 are elevations of different forms of the improved powder-grain. Fig. 5 is a side view of the grain of Fig. 1. Fig. 6 is a modified form of the grain of Fig. 1, with an exterior envelop or coating. Fig. 7 is a diagram of the old form of multiperforated grain, showing the portions which cause the subsequent combustion on decreasing areas. Fig. 8 is a sectional elevation of the improved means for forming the powder rod or grain. Figs. $8^a$ and $8^b$ are cross-sections on the lines $8^a$ and $8^b$ of Fig. 8, and Fig. 9 is a bottom view of the die portion thereof. Fig. 10 is a sectional elevation of a modified form of the die. Fig. 11 is a plan view thereof, and Fig. 12 a bottom view of the die.

The most serviceable of all the artillery powders of the class of smokeless powders is a colloid nearly all guncotton in the shape of multiperforated rods or grains. The success of this powder is due to its progressive rate of burning, owing to the fact that the flame of combustion can only attack its surface. As the configuration of such a grain exposes up to a certain limit a constantly-increasing burning-surface, it is evident that the pressure must be better maintained along the bore of a gun than with powders hitherto used. The perforations in the old form of multiperforated grains being circular in cross-section, as indicated in Fig. 7, the limit of increasing burning-surface is reached when the contiguous portions of the circular perforations merge into each other, and there are left at that moment in the intracircular spaces three-cornered rods $c'$, (indicated by the shaded portions,) the sides of which are concave or arcs of enlarged circles concentric with the axes of the original perforations $c$, and from this moment the resultant rods $c'$ of the original grains burn with a constantly-decreasing surface until the whole is consumed. This objectionable feature in the practical use of multiperforated powder has been recognized; but no solution of the difficulty has, so far as I am aware, been discovered.

I have devised a form of grain and a means for making it which entirely overcomes this inherent defect in multiperforated powder and which will provide a progressive rate of burning until the entire grain is consumed, this result being rendered possible by the all-important property of these colloid powders to burn only from the surface.

Figure 1:
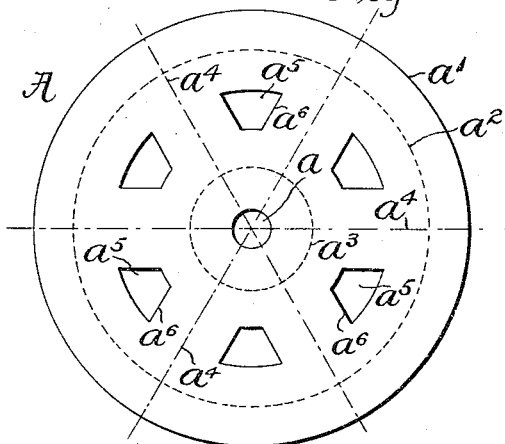

One of the improved forms of grain deemed most desirable is shown in Figs. 1 and 5, and consists of a cylindrical structure A, having a plurality of parallel longitudinal perforations extending from end to end of the cylinder. The shape and location of the perforations to provide the desired increasing burning area up to the entire consumption of the grain are determined by calculation based on the required thickness of the powder-wall between the perforations and between the perforations and the exterior surface, which thickness will depend upon the composition of the powder, the caliber and length of the rifle, and the conditions of loading. Thus, given a cylindrical powder-grain, as in Fig. 1, in which the thickness of the powder-wall shall be equal to two, (2,) a circular center hole $a$ of a diameter equal to one (1) will first be provided. Then, taking the center of said hole as an axis, provide the exterior contour or circumference $a'$ of the grain with a radius equal to five and one-half ($5\frac{1}{2}$) times the diameter of the center hole. Under equal conditions all the burning-surfaces of a homogeneous grain will be consumed in directions parallel with the original surface attacked by the flame of combustion and to equal extents, so that if one (1) represents the extent to which the original surface shall reach during combustion (at which time the projectile should be just leaving the muzzle of the rifle) then the exterior circumference $a'$ and original diameter of the grain will have decreased when burning an extent equal to one (1) and have reached the dotted circle $a^2$, and at the same time the central hole $a$ will have increased an extent also equal to one (1) and have reached the dotted circle $a^3$. To provide the other perforations $a^5$, the remaining area of the grain extending between the dotted circles $a^2$ $a^3$ is divided, say, into six equal parts bounded by the radial lines $a^4$. The walls of these other perforations may then be provided on short lines $a^6$, parallel with the radial lines at a distance therefrom in each direction equal to one, (1,) and pairs of these short lines will be connected to form the other walls of the perforations on lines concentric with the central hole, the inner wall at a distance outwardly equal to one (1) from the dotted circle $a^3$ and the outer wall at a distance inwardly equal to one (1) from the dotted circle $a^2$, thus providing in this instance the segmental-shaped holes $a^5$. It will result from the shape and location of these holes $a^5$ that while the wall of the center hole $a$ is burning outwardly toward the dotted circle $a^3$ and the exterior circumference is burning inwardly toward the dotted circle $a^2$ said holes $a^5$ will each be progressively increased in size, with their outer walls burning toward the dotted circle $a^2$ and the inner walls toward the dotted circle $a^3$ and the side walls burning in opposite directions toward the radial lines $a^4$, so that when the burning has progressed so that the dotted circles and the radial lines are simultaneously reached the entire grain will have been consumed, leaving absolutely nothing for further consumption. It will thus be apparent that as the powder is consumed each of the perforations of the grain gradually and progressively increases in size, providing an increasing burning area, until finally the perforations have so far enlarged as to merge into one another at the moment the entire grain is consumed.

It is obvious that the exterior contour or circumference $a'$ of the grain may be coated or enveloped or otherwise protected by some non-explosive or comparatively non-combustible material $b$, as indicated in the modification Fig. 6, in which case, as the exterior of the grain will not be attacked by the flame of combustion, the grain will have an area bounded by the dotted circle $a^2$ of Fig. 1, so that at the moment the perforations so far enlarge as to merge into one another the enveloping material $b$ will be reached and the entire grain consumed.

Figure 2:
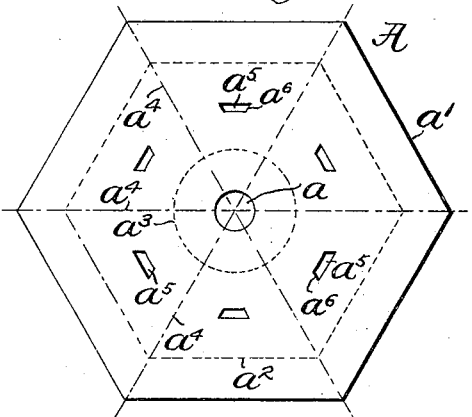

In the hexagonal form of grain shown in Fig. 2 substantially the same conditions prevail, except that in this case it is shown that the thickness of the grain may be varied so that the perforations $a^5$ may originally be smaller than is indicated in Fig. 1.

In the modified form and larger grain shown in Fig. 3 the number of perforations $a^5$ is increased, two concentric rows being employed with an increased effect—i. e., the provision of a progressively-increasing burning area with a greater increased ratio until the entire grain is consumed. In Fig. 4 the powder-grain is of rectangular form of any desired depth, provided with rectangular perforations $a^5$ so located that an increasing burning area is provided up to the moment the entire grain is consumed.

The improved form of powder-grain will preferably be made by the use of a press having a suitable die, the powder mass while in a plastic condition being forced through the die in the form of a more or less long perforated rod, which rod may be severed transversely into the desired length to form grains. A suitable press, together with a form of die, will now be described.

In the structure shown in Figs. 8 and 9 the die E is secured to the end of a suitable cylinder C, into which the plastic powder mass is fed from time to time to be acted on and forced outward through the die by the plunger D, operated in any proper manner.

The exterior contour of the powder rod or grain is formed by the interior wall or mouth 10 of the die-confining cap or end piece 20, said end piece having exterior screw-threads 11 to take into the threaded end of the press-cylinder C. The mandrels or other perforation-forming rods 12 13 are carried and supported by suitable spiders 14 15, respectively, the exterior annular portions of which are mounted one against the other and rigidly confined between a shoulder 16 on the cylinder and a like shoulder 17 on the end piece 20, so that both spiders with their mandrels may be removed by unscrewing the end piece from the cylinder.

The mandrel 12, the central one for forming the central perforation $a$, say, of the powder-grain shown in Fig. 1, has a screw-threaded shank 18 taking into a threaded central hub 19 of the spider 14, the threaded shank rising from the base of an inverted conical head 21 of the mandrel proper. The mandrels 13 for forming the row of perforations $a^5$ of the powder-grain shown in Fig. 1 are preferably formed at the end of a cylindrical shell 22, screw-threaded into the threaded central hub 23 of the spider 15 and concentric with the central mandrel 12, through which shell said mandrel projects with the free ends of all the mandrels substantially in line with the end of the mouth 10 of the die.

Figure 12:
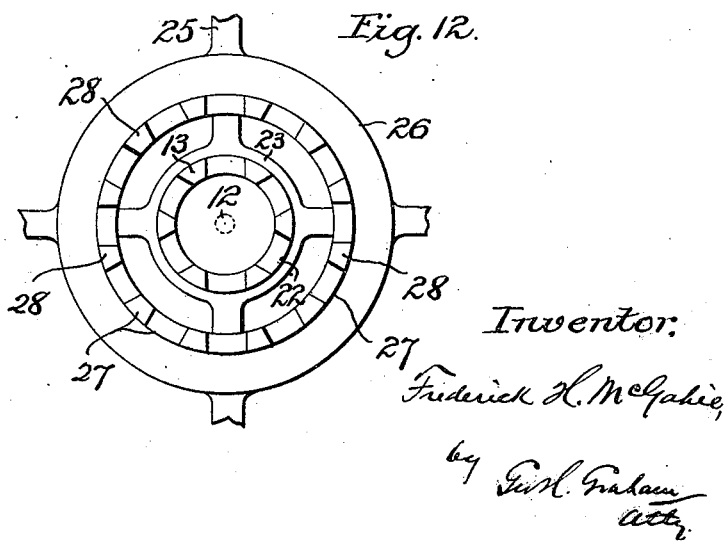

The mandrels 13 may obviously be formed from the cylindrical shell 22 by cutting away portions of the shell in any proper machine, the inner and outer walls of the cylindric shell being perfectly adapted without other preparation to the form of perforation $a^5$ of Figs. 1 and 3. For the perforations $a^5$ of Fig. 2 the exterior wall of the mandrels made from a cylindrical shell would of course have to be flattened to correspond with the shape of perforation shown.

Where a powder-grain with the increased number of perforations $a^5$ (shown in Fig. 3) is to be produced, the spider carrying the mandrels 13 will be preferably carrying the outer concentric row of mandrels for the additional row of perforations of said Fig. 3. Thus, as shown in Figs. 10 to 12, the spider 25 (like the spider 15) is provided with the hub 23, supporting the shell 22 and its mandrels 13, and in addition thereto is provided with a second hub 26, concentric with the hub 23, to which is screw-threaded the end of a cylindrical shell 27, surrounding the shell 22 and likewise formed with the mandrels 28, the two concentric sets of mandrels thus being carried by the one spider 25 and coöperating with a central mandrel and die-mouth, as described in connection with Fig. 8, to produce a powder-grain of the character shown in Fig. 3.

The arms of the spiders 14, 15, and 25 in order to not unduly impede the flow of the plastic mass to the exterior of the mandrels and to the die-mouth may be of the conical formation shown in the detail sections Figs. $8^a$ and $8^b$, the apex or thin edge being uppermost. The tubular character of the shells from which the mandrels 13 and 28 project enables the plastic mass to freely flow to the inner sides of the mandrels, so that the perforations will be uniformly made, such uniformity being also aided by the gradual contraction of the wall of the die-chamber $e$ in approaching the die-mouth 10, as is seen in Fig. 8.

What is claimed is—

1. The herein-described multiperforated powder-grain, each of the perforations of which has a wall or walls parallel with the opposed wall of the adjacent perforations and a wall or walls parallel with the exterior contour of the grain, and the perforations separated from each other and from the exterior of the grain by equal thicknesses of powder, whereby increasing burning-surfaces are provided which simultaneously merge upon the consumption of the grain.

2. The herein-described multiperforated powder-grain, each of the perforations of which has a wall or walls parallel with the opposed wall of the adjacent perforations and a wall or walls parallel with the exterior contour of the grain, and the perforations separated from each other and from the exterior of the grain by equal thicknesses of powder, whereby increasing burning-surfaces are provided which simultaneously merge upon the consumption of the grain, and said grain having an exterior non-explosive envelop.

3. The herein-described multiperforated powder-grain having a central perforation and a surrounding concentric row of segmental-shaped perforations, as set forth.

4. A multiperforated powder provided with a central perforation and surrounding additional perforations, each of the surrounding perforations having two walls radial to the center of the cylinder as set forth.

In witness whereof I have hereunto signed my name in the presence of two witnesses.

FREDERICK H. McGAHIE.

Witnesses:
GEO. H. GRAHAM,
E. L. TODD.